(12) United States Patent
Gandhi et al.

(10) Patent No.: US 6,486,307 B1
(45) Date of Patent: Nov. 26, 2002

(54) PREPARATION OF GLUCOSAMINE HYDROCHLORIDE

(75) Inventors: Neena Gandhi, Edmonton (CA); James Kenneth Laidler, Edmonton (CA)

(73) Assignee: Alberta Research Council Inc., Edmonton (CA)

( * ) Notice: Subject to any disclaimer, the term of this patent is extended or adjusted under 35 U.S.C. 154(b) by 0 days.

(21) Appl. No.: 09/682,349

(22) Filed: Aug. 23, 2001

(51) Int. Cl.$^7$ ................................. C08B 37/08
(52) U.S. Cl. ..................... 536/20; 568/583; 568/423; 568/492
(58) Field of Search ................ 536/20; 568/583, 568/423, 492

(56) References Cited

U.S. PATENT DOCUMENTS 2,884,411 A    4/1959    Heyns

OTHER PUBLICATIONS

Database CAPLUS on STN, Acc. No. 1975:410655, Ingle et al., 'Production of D–glucosamine hydrochloride (GAH) from fish canning waste.' Res. Ind. (1973), 18(2), pp. 54–56 (abstract).*

Database CAPLUS on STN, Acc. No. 1998:718206, CAO, 'Preparation of glucosamine hydrochloride from chitin.' Hauxue Shijie (1998), 39(5), pp. 250–253 (abstract).*

CAPLUS on STN, Acc. No. 2000:639481, Zhou et al., 'Preparation and properties of glucosamine hydrochloride.' Shuichan Xuebao (2000), 24(1), pp. 76–80 (abstract).*

Peters and Kowerski. Basic Chemical Principles, $2^{nd}$ ed. Saunders College Publishing. 1994, 1998, pp. 417–421.*

Chen, et al.; Preparation of D–glucosamine hydrocholoride; Journal—Shipkin Kexue (Beijing); 2000 vol. 21, No. 9, pp. 34–36.

Li, et al.; Preparation of D–glucosamine hydrochloride; Journal: Zhongguo Yaoke Daxue Xuebao; 1997, vol. 28, No. 1, pp. 56–58.

Huang, et al.; Preparation of D–glucosamine mydrochloride from Cryptotympana–pustulata; Journal: Tianran Chanwu Yanjiu Yu Kaifa; Date: 1993, vol. 5, No. 3, pp. 28–29.

Zhou, et al; Preparation and Properties of Glucosamine Hydrochloride; Journal: Shuichan Xuebao 2000 vol. 24, No. 1, pp. 76–80.

CAO; Preparation of Glucosamine Hydrochloride from Chitin; Journal: Huaxue Shijie; date: 1998 vol. 39, No. 5; pp. 250–253.

V. Yu. Novikov; Kinetics of Formation of D(+)–Glucosamine by Acid Hydrolysis of Chitin; Russian Journ Applied Chemistry; vol. 72, No. 1, 1999 pp. 156–161.

Novikov, et al.; "Synthesis of D(+)–Glucosamine Hydrochloride" Russian Journal of Applied Chemistry; vol. 70, No. 9, 1997, pp. 1467–1470.

* cited by examiner

*Primary Examiner*—Brian J. Davis
(74) *Attorney, Agent, or Firm*—Bennett Jones LLP

(57) ABSTRACT

A method of producing glucosamine hydrochloride from chitin by grinding the chitin to a very fine size and digestion with concentrated hydrochloric acid. The glucosamine hydrochloride is decolorized with activated charcoal, washed with ethanol and assayed by pH titration with a base.

14 Claims, 1 Drawing Sheet

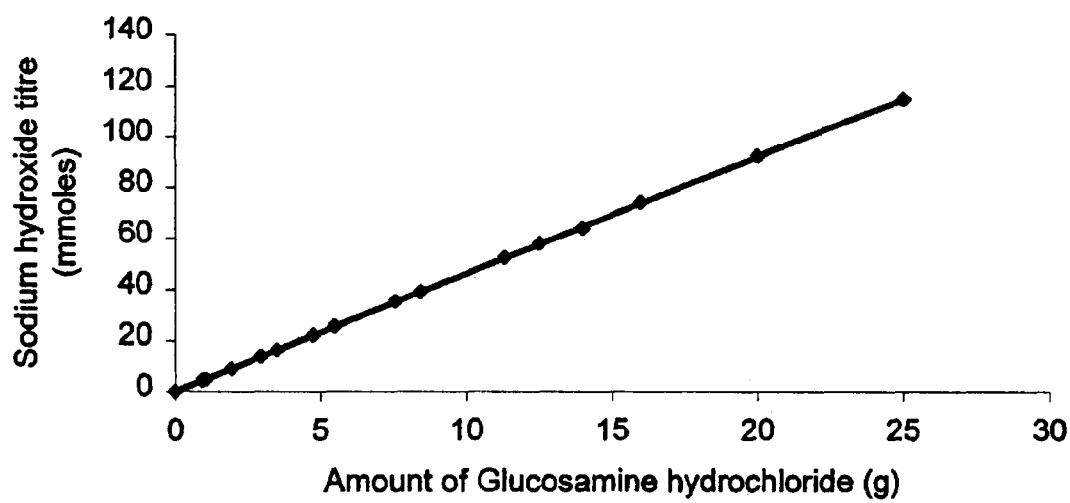
FIGURE 1: CALIBRATION GRAPH FOR TITRATION OF GLUCOSAMINE HYDROCHLORIDE WITH SODIUM HYDROXIDE

PREPARATION OF GLUCOSAMINE HYDROCHLORIDE

BACKGROUND OF INVENTION

The present invention relates to methods of preparing glucosamine hydrochloride from chitin or chitinaceous material.

Glucosamine hydrochloride (GHCl) is an amino sugar which is incorporated into the structure of body tissues. It comprises about 80% glucosamine, a compound helpful in maintaining joint health in individuals suffering from degenerative conditions such as arthritis. When orally ingested, it is selectively taken up by joint tissues to exert beneficial effects. Glucosamine may also have other therapeutic effects such as antiviral, anti-cancer, anti-aging, immune boosting or cholesterol lowering activity.

GHCl may be obtained by hydrolysis and deacetylation of chitin, a polymer of N-acetyl glucosamine or by the hydrolysis of chitosan with hydrochloric acid. It is desirable if such processes are efficient in both time and cost, and produce high-purity product with good yield. As well, it would be advantageous to provide a quick, simple and accurate method of assaying GHCl to be used in conjunction with a method of producing GHCl.

SUMMARY OF INVENTION

The present invention is directed to a method of producing glucosamine hydrochloride from chitin or chitinaceous material, said method comprising the steps of: (a) grinding the chitin or chitinaceous material to less than about −20 mesh; (b) digesting the chitin with prewarmed, concentrated HCl, by mixing the chitin with the HCl, and heating to about 95° C. to produce a slurry; (c) cooling the slurry to room temperature and filtering the precipitate; (d) dissolving the precipitate in water and with activated charcoal at room temperature; (e) filtering the solution and discarding the solids; (f) evaporating the solution to recover GHCl solids; (g) washing the solids with ethanol and filtering the solids/ethanol mixture to separately recover both the solids and the ethanol; and (h) drying the solids.

In another aspect, the invention may comprise a method of producing glucosamine hydrochloride from chitin or chitinaceous material, said method comprising the steps of: (a) hydrolysing the chitin in hydrochloric acid; (b) precipitating the glucosamine hydrochloride; (c) separating the precipitated glucosamine hydrochloride and redissolving it in water; and (d) assaying for GHCl by pHmetric titration.

In another aspect, the invention may comprise a method of assaying GHCl in solution comprising the step of measuring the amount of base necessary to raise the pH of the solution to a pre-determined value and corresponding the amount of base to an amount of GHCl. The base may be sodium hydroxide.

BRIEF DESCRIPTION OF DRAWINGS

The invention will now be described by way of an exemplary embodiment with reference to the accompanying drawing:

FIG. 1 is a calibration graph illustrating the amount of sodium hydroxide required to neutralize GHCl.

DETAILED DESCRIPTION

The present invention provides for an efficient method of producing GHCl from chitin. When describing the present invention, the following terms have the following meanings, unless indicated otherwise. All terms not defined herein have their common art-recognized meanings.

The term "glucosamine hydrochloride"or "GHCl"refers to the hydrochloride salt of glucosamine, including all enantiomers and optical isomers thereof. The term "chitin" refers to a polymer of N-acetyl glucosamine and includes any material enriched in chitin, which may be referred to as chitinaceous material. The term "about"refers to a range of plus/minus 10% of the stated value.

In one embodiment, the method of the present invention comprises a multi-step process as detailed below. The chitin or chitinaceous material may be any material rich in chitin such as by-products of the shrimp, crab and lobster industries. The first step is to clean and grind the chitin to a small size. Preferably, the chitin should be ground to about 20 mesh (850 $\mu$m) size to assist in avoiding slow dissolution and to avoid charring during the hydrolysis reaction.

The ground chitin is then digested with concentrated hydrochloric acid. Preferably, an acid-chitin ratio of about 2:1 (w:w) is used. Greater amounts of HCl does provide marginally better yield and purity but may not be offset by the increased usage of HCl. Smaller amounts of HCl may adversely impact yield and purity. The reaction should be maintained at about 95° C. for about 75 minutes, and preferably longer than about 60 minutes and not longer than about 90 to about 120 minutes. Longer reaction times may cause degradation or decomposition of the glucosamine product. Shorter reaction times may not allow complete reaction of the chitin. It is preferred that the reaction not take place with reflux (T>100° C.). It is preferred that the hydrochloric acid be warmed prior to addition of the chitin. Preferably, the acid is prewarmed above 50° C. and more preferably to about 65° C. The chitin may then be added gradually with stirring to prevent excess foaming.

Preferably, the reaction apparatus includes a hydrochloric acid vapour recovery system which may comprise a cooled water trap to capture and condense the vapours.

After digestion with the acid, the reaction slurry is allowed to cool to room temperature, precipitating GHCl as a result. The precipitate is removed by filtration and the filtrate may be discarded after neutralization. The precipitate containing the GHCl may then be dissolved and decolourised by dissolving in water with activated charcoal. Preferably, about 2 grams per 100 grams of chitin starting material is used at this step. The decolourising solution may be stirred for about 30 minutes. The solution is then filtered to remove insoluble waste products and the activated charcoal. The filtrate may be washed with water and partially dried.

The partially dried solids may then be washed with ethanol. Preferably, a small amount (150 ml per 100 g of chitin) of 95% ethanol is suitable. Dilute ethanol is not preferred because the GHCl may solubilize and be lost. The ethanol slurry may then be filtered, the filtrate recovered and distilled to recover the ethanol and the solids obtained which comprise substantially pure GHCl. The GHCl may then be dried to produce the final product.

The following examples are provided to illustrate the claimed invention and are not intended to limit the invention in any manner.

EXAMPLE 1

A one-liter, three-necked flask equipped with a thermometer, overhead stirrer, heating mantle and condenser, was charged with 200 g of concentrated hydrochloric acid (36%) and allowed to warm up to 65° C. To this prewarmed acid, 100 g of chitinaceous raw material (ground to −20 mesh size in a Wiley mill) of 7.9% moisture content was added gradually over a period of 5 minutes, to avoid foaming. The temperature was allowed to steadily increase to 95° C. over a 20-minute period. The hydrolytic reaction was allowed to proceed for 75 minutes at 95±1° C. with constant stirring, after which the solution was allowed to cool to room temperature. During the reaction, all hydrochloride fumes were condensed into a trap containing reverse osmosis (RO)-water. This acid trap was repeatedly used over different reactions so as to obtain hydrochloric acid, which could be recycled and reused.

The cooled reaction contents were then suction-filtered to obtain a precipitate containing insoluble glucosamine hydrochloride (GHCl). This precipitate was washed twice with the filtrate, which ensured effective removal of acid-soluble impurities in the GHCl fraction. To the latter was added 300 g of RO-water and 2.1 g of 100 mesh Darco G-60 activated carbon and this was magnetically stirred for 30 minutes and then suction-filtered to separate the carbon and adherent impurities. 50 g of RO-water was used for washing the precipitate. The decolorized filtrate was then subjected to rotary vacuum evaporation to almost near-dry condition at 40° C. The GHCl residue was taken up using 150 g of 95% ethanol at room temperature into an Erlenmeyer flask. This ethanolic suspension was again suction-filtered to obtain a residue consisting of pure GHCl along with traces of adherent alcohol. The residue was dried in an oven at 50° C. for 13 hours during which solvent traces evaporated. The ethanolic filtrate was subjected to distillation in order to recover the ethanol.

GHCl yield was 69.69% with a purity of 100% as determined by pHmetric titration.

EXAMPLE 2

The equipment described in Example 1 was employed in this example. 100 g of 20 mesh chitin was charged into the reaction vessel containing 200 g of prewarmed concentrated HCl at 65° C. The reaction was allowed to continue for 75 minutes at 95° C. and then the hydrolysate was cooled overnight. It was then filtered and the rest of the procedure carried out as in Example 1. Amount of activated charcoal added was 2 g.

The initial hydrolysate was very difficult to filter. Filtering time was prolonged beyond 4 hours and the sintered glass filter had a tendency to get clogged. Therefore, it had to be cleaned and replaced several times during the filtration. The slightly lower amount of charcoal proved to be another problem. The decolorized filtrate (which was colorless when 2.1 g of charcoal was used as in Example 1) was found to be red-colored. Consequently, a higher amount of ethanol (46%) was required for washing the GHCl.

While a marginally higher recovery of GHCl (70.43%) was obtained, the purity (98.23%) was adversely affected due to the lower amount of carbon used for decolorization. Prolonged cooling and crystallization resulted in filtration difficulty.

EXAMPLE 3

The general trend of innovations in the GHCl manufacturing process has been towards elimination of activated charcoal. GHCl preparation without the use of charcoal was carried out in a similar manner to that of Example 1.

After the hydrolysate of the 75-minute reaction was cooled to ambient temperature, it was filtered and the precipitate washed with 244 g of ethanol in order to remove impurities. The precipitate was then dissolved in RO-water as before, filtered to remove any insoluble contaminants, and evaporated under vacuum. The GHCl residue was transferred from the evaporation flask using 150 g of ethanol, filtered and dried.

Elimination of activated charcoal required the use of a 2.6-fold higher amount of ethanol and resulted in a 68.17% yield of GHCl of 98.28% purity. Time required for filtrations was also much more than when activated charcoal was used as in Example 1.

EXAMPLE 4

GHCl synthesis was attempted using activated carbon as the sole purifying agent, in order to eliminate the use of ethanol.

The procedure in Example 1 was followed up to evaporation of the aqueous GHCl solution, and the residue dried without the solvent wash.

It was found that although the yield increased marginally, the purity was reduced by 2% and the acid adherent to GHCl was found to have a 100-fold higher acid concentration than that compared with the use of both activated carbon and ethanol wash. Increasing the amount of activated carbon or decolorization time did not affect the result.

EXAMPLE 5

The methodology of Example 1 was followed, except that the reaction was carried out under reflux (105° C.).

After refluxing for 75 minutes, the hydrolysate was cooled. The hydrolyzate was difficult to filter or clarify by any means suction filtration, centrifugation etc., even after the addition of considerable amount of hydrochloric acid.

EXAMPLE 6

The purpose of this example is to demonstrate the importance of chitin texture. When chitin ground in a coffee mill or ball mill was used as opposed to the ground (−20 mesh) chitin from a Wiley mill, the minimum amount of HCl required for solubilizing 100 g of chitin was 607 g, an increase of a factor of about four.

While recovery and recycle of acid will make the effect of increased acid use negligible, there will be a significant increase in the process cost due to the need for larger reactors and higher energy costs.

EXAMPLE 7

The solubility of chitin is a function of temperature. Therefore, it solubilizes more easily in warm acid (65° C.) as opposed to cold acid. This is significant as it reduces the HCl requirement to half of that required for cold solubilization of chitin.

EXAMPLE 8

The use of 100 mesh DARCO™ G-60 activated carbon is preferred. This carbon was found to satisfy the process requirements of acid-insoluble carbon in order to achieve the high reported yield and purity of GHCl. Many commercial varieties of carbon, such as ANACHEMIA™ and NORITE™, are not preferred because they are soluble to a considerable extent even in dilute hydrochloric acid causing them to contaminate the product by solubilizing in the adhering acid film and are difficult to remove even in the ethanol wash.

EXAMPLE 9

This example was carried out to prepare GHCl by the prior art method of Purchase & Braun, (d-Glucosamine Hydrochloride, Organic Synthesis, Vol. 26, pp. 36–37,1946.) The equipment from Example 1 was used for this purpose. 20 g of 20 mesh chitin was added to 116 g of concentrated hydrochloric acid for 2.5 hours and heated on a boiling water bath with constant stirring. At the end of the reaction, 100 g of water and 2 g of activated charcoal were added to the hydrolyzate. The flask contents were stirred at 60° C. for one hour and then filtered. The filtrate was concentrated by evaporation under vacuum at 50° C. The GHCl crystals obtained were washed with 50 g of 95% alcohol and dried in an oven overnight. The GHCl yield was 67.5% with a purity of 95.31%.

This experiment yielded a GHCl product of lower purity and utililzed 2.9-fold higher amount of HCl and ethanol. Reaction time was much higher and energy consumption is higher since decolorization is carried out for 1 hour at 60° C. Addition of water to the hydrolyzate without prior filtration may have also contributed to a lower yield as GHCl has greater solubility (vice versa for unreacted chitin) in dilute acid as compared to the concentrated one.

EXAMPLE 10

This example was performed in order to prepare GHCl by the process of Novikov and lvanov, (Synthesis of D (+)-Glucosamine Hydrochloride, Russian Journal of Applied Chemistry, Vol. 70, No. 9, pp.1467–1470,1997.)100 g of chitin was hydrolyzed for 2 hours with 200 g of concentrated HCl in a set-up similar to that used in Example 1 except that a water bath was used instead of a heating mantle. Since the temperature was unstated, 95° C. was used in order to compare the results with the process of the invention. After hydrolysis was completed, the reaction mixture was allowed to cool to room temperature and stand for 24 hours for crystallization of GHCl. The hydrolyzate was filtered at room temperature and washed with ethanol till a pale yellow filtrate was obtained. 291 g of ethanol was consumed during this step. The washed precipitate was dissolved in 300 g of water and filtered. The resulting filtrate was concentrated under vacuum at 50° C. The GHCl crystals were washed with small amounts of ethanol and filtered till a colorless mother liquor was obtained. Ethanol required for this step was 194 g. The yield and purity of GHCl were found to be 70.4% and 104%, respectively.

As mentioned in Example 2, the cooling of hydrolyzate and subsequent crystallization of GHCl caused filtration difficulties, besides more than doubling the effective process time. The amount of ethanol used was 3.2-fold that used in the process of the invention. The use of solely ethanol raises the cost of the chemical component of the process by 30% over that of the process in the invention which uses both activated carbon and ethanol. Besides, ethanol being a flammable solvent, use of large quantities as well as the storage is more hazardous to the environment. Apart from this, its flammability results in the need for specialized safety equipment, venting, etc. all of which contribute to the overall manufacturing cost.

Operating Conditions Reactant Ratio

Reaction time=120 min, reaction temperature=95° C., Darco G-60 activated charcoal=2.1 g/100 g chitin, decolorization time=30 min, 95% ethanol wash

[t4]

| Chitin:HCl (w/w) | 1:1.5 | 1:2 | 1:2.5 |
|---|---|---|---|
| GHCl yield (%) | 62.91 | 65.73 | 66.31 |
| GHCl purity (%) | 98.74 | 97.86 | 99.08 |

Reaction Time

Chitin: HCl=1:2, reaction temperature=95° C., Darco G-60 activated charcoal=2.1 g/100 g chitin, decolorization time=30 min, 95% ethanol wash

[t5]

| Time (min) | 60 | 75 | 90 | 120 |
|---|---|---|---|---|
| GHCl yield (%) | 63.59 | 69.69 | 66.91 | 65.73 |
| GHCl purity (%) | 98.98 | 100.41 | 98.44 | 97.86 |

Reaction Temperature

Chitin: HCl=1:2, reaction time=75 minutes, Darco G-60 activated charcoal=2.1 g/100 g chitin, decolorization time=30 min, 95% ethanol wash hydrolyzate after reflux could not be clarified.

[t6]

| Temperature (C) | 95 | 105 (reflux)* |
|---|---|---|
| GHCl yield (%) | 69.69 | N.A. |
| GHCl purity (%) | 100.41 | N.A. |

*drolyzate after reflux could not be clarified.

Activated Charcoal

Decolorization time=30 min, Chitin: HCl=1:2, reaction time=75 min, reaction temperature=95%C

[t2]

| Darco G-60 (g)/100 g chitin | 2.00 | 12.10 | 2.20o | 2.50 |
|---|---|---|---|---|
| Color of filtrate after decolorization and filtration | Red | Light yellow | Light yellow | Light yellow |

Decolorization Time

Darco G-60 activated charcoal=2.1 g/100 g chitin, Chitin: HCl=1:2, reaction time=75 min, reaction temperature=95°

[t7]

| Time (min) | 15 | 30 | 60 | 90 |
|---|---|---|---|---|
| Filtrate after decolorization and filtration | Red | Light yellow | light yellow | light yellow |

Solvent Wash

Chitin:HCl=1:2, reaction time=120 min, reaction temperature=95° C., Darco G-60 activated charcoal=2.1 g/100 g chitin, decolorization time=30 min

[t1]

| Ethanol | 95% | 50% | 0% |
|---|---|---|---|
| GHC1 yield (%) | 65.73 | 28.13 | 68.83 |
| GHCL purity (%) | 97.86 | 96.67 | 96.19 |
| Loss of GHC1 solubilized into ethanol (1%) | 4.50 | 59.12 | 0.00 |

EXAMPLE 11

Sodium hydroxide of normality, 1N, was taken in a burette and used to titrate GHCl solutions of different concentrations. The alkali titre was determined for the change of pH from 5+/−0.2 to 9+/−0.2, using a pHmeter. This amount was compared to that of a known standard in order to calculate the exact amount of GHCl present, which in turn allowed for an accurate determination of the purity of the synthesized GHCl. 1 g of pure GHCl was found to require 4.0+/−0.05 mmoles of sodium hydroxide for neutralization. This was in agreement with molecular weight data (1 g of GHCl contains 4.64 mmoles).

2.0690 g of GHCl obtained by the process of Example 1 was titrated with 1N NaOH. The initial pH of the GHCl solution was 4.9. Amount of NaOH required to change the pH to 9.05 was 9.52 ml i.e. 9.5 mmoles. This was found to correspond to 2.078 g of GHCl by comparing it to the standard calibration graph as shown in FIG. 1. Hence, purity of GHCl in the experimental sample is (2.078/2.0690)×100= 100%.

As will be apparent to those skilled in the art, various modifications, adaptations and variations of the foregoing specific disclosure can be made without departing from the scope of the invention claimed herein.

What is claimed is:

1. A method of producing glucosamine hydrochloride from chitin or chitinaceous material, said method comprising the steps of:
   (a) grinding the chitin or chitinaceous material to less than about −20 mesh;
   (b) digesting the chitin with prewarmed, concentrated HCl, by mixing the chitin with the HCl, and heating to about 95° C. to produce a slurry;
   (c) cooling the slurry to room temperature and filtering the precipitate;
   (d) dissolving the precipitate in water and with activated charcoal at room temperature;
   (e) filtering the solution and discarding the solids;
   (f) evaporating the solution to recover GHCl solids;
   (g) washing the solids with ethanol and filtering the solids/ethanol mixture to separately recover both the solids and the ethanol; and
   (h) drying the solids.

2. The method of claim 1 wherein the chitin is digested with concentrated HCl without reflux.

3. The method of claim 1 wherein the chitin is ground to less than about 1 mm particle size.

4. The method of claim 3 wherein the chitin is ground to less than about 850 µm particle size.

5. The method of claim 1 wherein the evaporation step (f) is performed under vacuum and at 40° C.

6. The method of claim 1 wherein the concentrated HCl is prewarmed to above about 50° C. prior to chitin addition.

7. The method of claim 6 wherein the concentrated HCl is prewarmed to about 65° C. prior to chitin addition.

8. The method of claim 6 wherein the chitin is gradually added to the concentrated HCl with stirring.

9. The method of claim 1 wherein ethanol is recovered and reused in the method.

10. The method of claim 1 wherein HCl vapours are recovered and condensed to be reused in the method.

11. The method of claim 1 wherein the solution produced in step (e) is assayed for GHCl by pHmetric titration.

12. The method of claim 11 wherein the amount of GHCl in solution corresponds to the amount of base added to change the pH of the solution from about 5.0 to about 9.0.

13. A method of producing glucosamine hydrochloride from chitin or chitinaceous material, said method comprising the steps of:
   (a) hydrolysing the chitin in hydrochloric acid;
   (b) precipitating the glucosamine hydrochloride;
   (c) separating the precipitated glucosamine hydrochloride and redissolving it in water; and
   (d) assaying for GHCl by pHmetric titration.

14. The method of claim 13 wherein the amount of GHCl in solution corresponds to the amount of base added to the change the pH of the solution from about 5.0 to about 9.0.

* * * * *